US010838081B2

(12) United States Patent
Metz et al.

(10) Patent No.: US 10,838,081 B2
(45) Date of Patent: Nov. 17, 2020

(54) PHOSPHORESCENT PLATE READER

(71) Applicant: INNIXIM, Creteil (FR)

(72) Inventors: Matthieu Metz, Yerres (FR); Guillaume Augais, Paris (FR)

(73) Assignee: INNIXIM, Creteil (FR)

(*) Notice: Subject to any disclaimer, the term of this patent is extended or adjusted under 35 U.S.C. 154(b) by 0 days.

(21) Appl. No.: 15/740,764

(22) PCT Filed: Jun. 10, 2016

(86) PCT No.: PCT/FR2016/051411
§ 371 (c)(1),
(2) Date: Dec. 28, 2017

(87) PCT Pub. No.: WO2017/001737
PCT Pub. Date: Jan. 5, 2017

(65) Prior Publication Data
US 2018/0188389 A1 Jul. 5, 2018

(30) Foreign Application Priority Data
Jul. 2, 2015 (FR) ...................................... 15 56282

(51) Int. Cl.
*G01T 1/20* (2006.01)
*G01T 7/00* (2006.01)

(52) U.S. Cl.
CPC ............ *G01T 1/2014* (2013.01); *G01T 7/005* (2013.01)

(58) Field of Classification Search
None
See application file for complete search history.

(56) References Cited

U.S. PATENT DOCUMENTS

| | | | | |
|---|---|---|---|---|
| 3,925,657 | A | * | 12/1975 | Levine .............. H01L 27/14806 257/228 |
| 4,749,861 | A | * | 6/1988 | Watanabe ............. G01T 1/2014 250/586 |
| 4,933,558 | A | | 6/1990 | Carter et al. |
| 5,578,835 | A | | 11/1996 | Rogers et al. |
| 5,747,825 | A | * | 5/1998 | Gilblom ............. H04N 1/00127 250/586 |
| 6,326,636 | B1 | | 12/2001 | Isoda et al. |
| 6,495,850 | B1 | | 12/2002 | Struye et al. |

(Continued)

FOREIGN PATENT DOCUMENTS

| | | |
|---|---|---|
| EP | 0 599 481 A1 | 6/1994 |
| EP | 1 356 267 A1 | 10/2003 |

(Continued)

OTHER PUBLICATIONS

International Search Report, dated Sep. 23, 2016, from corresponding PCT application No. PCT/FR2016/051411.

*Primary Examiner* — Edwin C Gunberg
(74) *Attorney, Agent, or Firm* — Nixon & Vanderhye

(57) ABSTRACT

Disclosed is a digital radiography phosphorescent plate reader which includes a stimulation unit, a reading unit and a mechanism for moving the plate. The reading unit includes a TDI sensor in which the line transfer speed is correlated with the speed of movement of the plate. The reader is optimised to achieve a high reading efficiency and a high spatial resolution, whilst reducing the cost and space requirements.

19 Claims, 5 Drawing Sheets

(56) References Cited

U.S. PATENT DOCUMENTS

| | | | | |
|---|---|---|---|---|
| 6,765,225 B2* | 7/2004 | Yasuda | ................ | G03B 42/02 250/584 |
| 7,161,160 B2 | 1/2007 | Leblans et al. | | |
| 2002/0017622 A1* | 2/2002 | Kohda | ................ | G03B 42/08 250/584 |
| 2002/0036277 A1* | 3/2002 | Karasawa | ............. | G03B 42/02 250/586 |
| 2012/0235062 A1* | 9/2012 | Patel | ..................... | G01T 1/04 250/474.1 |
| 2013/0015371 A1 | 1/2013 | Bueno et al. | | |

FOREIGN PATENT DOCUMENTS

| | | |
|---|---|---|
| EP | 1 359 204 A1 | 11/2003 |
| WO | 02/50520 A1 | 6/2002 |

* cited by examiner

PHOSPHORESCENT PLATE READER

The present invention relates to a phosphorescent plate reader, in particular for use in the medical field of computed radiography (CR).

BACKGROUND OF THE INVENTION

A phosphorescent plate serves to store an image that is imprinted—hereinafter denoted as recorded—in this plate by a recording radiation, for example X-rays, in the form of electrons in the plate that have been placed into an excited state by the recording radiation. The number of electrons that are in the excited state at a point on the plate is an increasing function of the amount of the recording radiation that has been received at this point on the plate. Thus, the image results from variations in this amount of the recording radiation received between different points on the plate. It is thus recorded in the phosphorescent plate in the form of spatial variations in the number of electrons that are in the excited state.

Reading the image is then carried out by applying stimulating energy, which transfers the electrons in the plate that are in the excited state after recording to an energy state that is even higher, but that is unstable. These electrons then spontaneously return to their ground state from the unstable state, emitting phosphorescence radiation. Capturing an image of the plate that is formed by this phosphorescence radiation is the operation of reading the plate.

Thus, by the principle of phosphorescence, when stimulating energy is applied in the form of stimulating light, the wavelength of the phosphorescence radiation is different from that of the stimulating light, often shorter than this latter. In particular, for certain phosphorescent plates that are intended for X-ray imaging, the stimulating light is red light, corresponding to a wavelength comprised between approximately 630 nm (nanometers) and 700 nm, and the phosphorescence radiation is of blue color, corresponding to a wavelength comprised between approximately 380 nm and 450 nm.

Document EP 1,356,267 describes several phosphorescent plate readers. In particular, it describes readers which use fiber-optic faceplates to collect the phosphorescence radiation, and charge-coupled device image array sensors, commonly known by the acronym CCD, for capturing the image being read.

From this prior art, an object of the present invention is to propose novel phosphorescent plate readers which improve the reading efficiency. In the context of the present invention, reading efficiency for a phosphorescent plate denotes the quotient of the number of photons of phosphorescence radiation that are detected by the reader, over the number of electrons which had been placed in the excited state during the recording of the image in the phosphorescent plate, for one and same point in this plate. In other words, the invention aims to propose phosphorescent plate readers which have an improved reading sensitivity.

Other objects of the invention are to propose phosphorescent plate readers for which at least one of the following characteristics is improved: a short reading operation time, a sharper reading spatial resolution, a lower cost price for the reader, a limited space requirement for the reader and reader models that can be easily adapted for phosphorescent plates of varying widths.

SUMMARY OF THE INVENTION

In order to achieve at least one of these objects or others, a first aspect of the invention proposes a phosphorescent plate reader which comprises:

- stimulation means for directing a flow of stimulating energy over a whole transverse strip of a phosphorescent plate being read;
- at least one reading unit, comprising an entrance window for collecting a phosphorescence radiation that is produced by portions of the phosphorescent plate in response to the flow of stimulating energy, and also comprising at least one image sensor and an optical system which is arranged in order to transfer the phosphorescence radiation from the entrance window to the image sensor; and
- a drive mechanism, which is capable of guiding and driving in translation the plate being read so that this plate passes in front of the stimulation means and the entrance window of the reading unit.

Thus, the image sensor captures an image of the whole transverse strip of the plate being read while the plate is driven in translation, this image being formed by the phosphorescence radiation. In particular, it is the simultaneous reading of this whole transverse strip which provides the speed of the reading operation.

According to another characteristic of the invention, the image sensor is of the "time-delay-integration" array sensor type. The reader is thus adapted so that the time-delay-integration image array sensor has a line-transfer speed that is parallel to and correlated with a drive speed of the plate by the drive mechanism.

In the first embodiments of the invention, the stimulation means are arranged downstream the entrance window of the reading unit relative to a direction of translation of the plate being read, in order to direct the flow of stimulating energy onto the plate in the form of a beam of stimulating light. This beam of stimulating light is then incident on the plate on a same side thereof as the reading unit, and diffuses simultaneously across the whole transverse strip of the plate being read, up to upstream of the entrance window of this reading unit with respect to the direction of translation of the plate. In this case, the stimulation means may advantageously be capable of directing the beam of stimulating light onto the plate being read with a propagation vector of this beam that is oblique in the direction of the entrance window of the reading unit with respect to a direction perpendicular to the plate.

Given that the reading unit and the light stimulation means are on one and same side of the plate being read, plates equipped with a rear face which reflects the phosphorescence radiation can be used. The reading efficiency can thus be doubled in this way, since the phosphorescence photons that are emitted towards the rear side of the plate are reflected in the direction of the reading unit.

Advantageously for these first embodiments, the reading unit may also comprise a filtering element which is arranged between the optical system and the time-delay-integration image array sensor, or at the entrance window, and which is adapted in order to transmit the phosphorescence radiation selectively with respect to the stimulating light. In this manner, the image that is captured is not disturbed by a significant amount of stimulating light which would penetrate into the reading unit and reach the image sensor. Preferably, the filtering element may comprise an inorganic material based on metal oxides, such as cobalt aluminate, also called cobalt blue, or cobalt stannate, also called cerulean blue. Indeed, inorganic light filtering pigments are less fluorescent than organic pigments, these latter then requiring using additional filters against the florescence light from the organic filters themselves.

In second embodiments of the invention, the stimulation means are arranged on a side of the plate being read that is opposite the reading unit, in order to direct the flow of stimulating energy onto this plate in the form of a heat flow which simultaneously increases a temperature across the whole transverse strip while, and also optionally before, this transverse strip passes in front of the entrance window of the reading unit. These second embodiments are also compatible with the use of reflecting phosphorescent plates, with which the reading efficiency is doubled.

In preferred embodiments of a phosphorescent plate reader according to the invention, at least one of the following improvements may be used alone or in combination with several of the following:

the time-delay-integration image array sensor may be of the charge-coupled device, or CCD, type, and preferentially of the charge-coupled device image sensor type that has been thinned and is capable of receiving the phosphorescence radiation via a rear face of a substrate of this sensor. The sensitivity of the reader can thus be further improved;

a line-transfer that is implemented by the time-delay-integration image array sensor during the operation of the phosphorescent plate reader may be synchronized using a clock which simultaneously controls the drive means, in order to set a drive speed of the plate being read in front of the stimulation means and the entrance window of the reading unit. Thus, the line-transfer speed of the image sensor can be precisely correlated with the drive speed of the phosphorescent plate;

the optical system of the reading unit may have a numerical aperture that is greater than 0.70, preferably greater than 0.90, at the entrance window of the reading unit. The efficiency of collection of the phosphorescence radiation can thus be improved, and thus also the reading efficiency;

the optical system of the reading unit may comprise a fiber-optic faceplate which has a transverse dimension that is greater than or equal to a length of the transverse strip of the plate being read, this transverse dimension of the fiber-optic faceplate and the length of the transverse strip being measured perpendicular to the translation drive direction of the plate being read. Moreover, the fiber-optic faceplate may have a longitudinal dimension that is less than or equal to a length of columns of the time-delay-integration image array sensor, this longitudinal direction of the fiber-optic faceplate and the length of columns being measured parallel to the translation drive direction of the plate being read. In this case, and when the stimulating energy is provided in the form of light, the optical fibers of the fiber-optic faceplate may be at least partially constituted by a material capable of selectively transmitting the phosphorescence radiation while absorbing a part of the stimulating light that has passed through the entrance window of the reading unit;

the stimulation means and the reading unit may be adapted so that the transverse strip of the plate being read, the image of which is formed by phosphorescence radiation and captured during a single passage of the plate in the reader, has a transverse extent that is greater than 20 mm, preferably greater than 28 mm, perpendicular to the translation drive direction of the plate; and the reading unit may comprise several image sensors that are arranged parallel to each other and offset transversally relative to the drive direction of the phosphorescent plate, so as to increase a total segment length of transverse strips in the plate being read, the images of which are formed by the phosphorescence radiation and captured during a single passage of the plate in the reader.

A second aspect of the invention proposes a set for reading phosphorescent plates, which comprises:

a phosphorescent plate reader according to the first aspect of the invention; and at least one phosphorescent plate capable of being introduced into the reader, this plate comprising a layer of a phosphorescent material suitable for producing a phosphorescence radiation in response to a stimulating light which illuminates the phosphorescent material, the phosphorescence radiation and the stimulating light having different wavelengths, or in response to heating of the phosphorescent material, in portions of the plate which have been previously exposed to image recording radiation, the phosphorescent plate also comprising a layer of a material suitable for reflecting the phosphorescence radiation, that is arranged parallel to the layer of phosphorescent material and so as to be situated opposite the reading unit when the plate is introduced into the reader.

A third aspect of the invention proposes a method for reading a phosphorescent plate, which comprises using a set for reading phosphorescent plates according to a second aspect of the invention, in order to read an image previously recorded in the plate during a first passage of this plate in the reader, in order to capture a raw image of the plate that is formed by the phosphorescence radiation. The method of the invention also comprises at least one of the following two corrective steps:

/i/ a process for eliminating device-caused defects, comprising using the reader again with the same plate during another passage of this plate in the reader that is carried out after the first passage, in order to capture a background image of the plate, then subtracting the background image from the raw image; and /ii/ a process for local correction, comprising multiplying or dividing intensities that were captured by the reading unit during the first passage of the plate in the reader, for at least some of the points of the image in the plate, by a response function that has different values for several of these points of the image.

BRIEF DESCRIPTION OF THE DRAWINGS

Other features and advantages of the present invention will become apparent in the description below of non-limitative embodiment examples, with reference to the attached drawings, in which.

DETAILED DESCRIPTION OF THE PREFERRED EMBODIMENTS

For sake of clarity, dimensions of different elements represented in the figures do not correspond either to actual dimensions or to actual dimensional relationships. Moreover, identical references that are indicated in different figures denote identical elements, or those having identical functions.

Figure 1A:
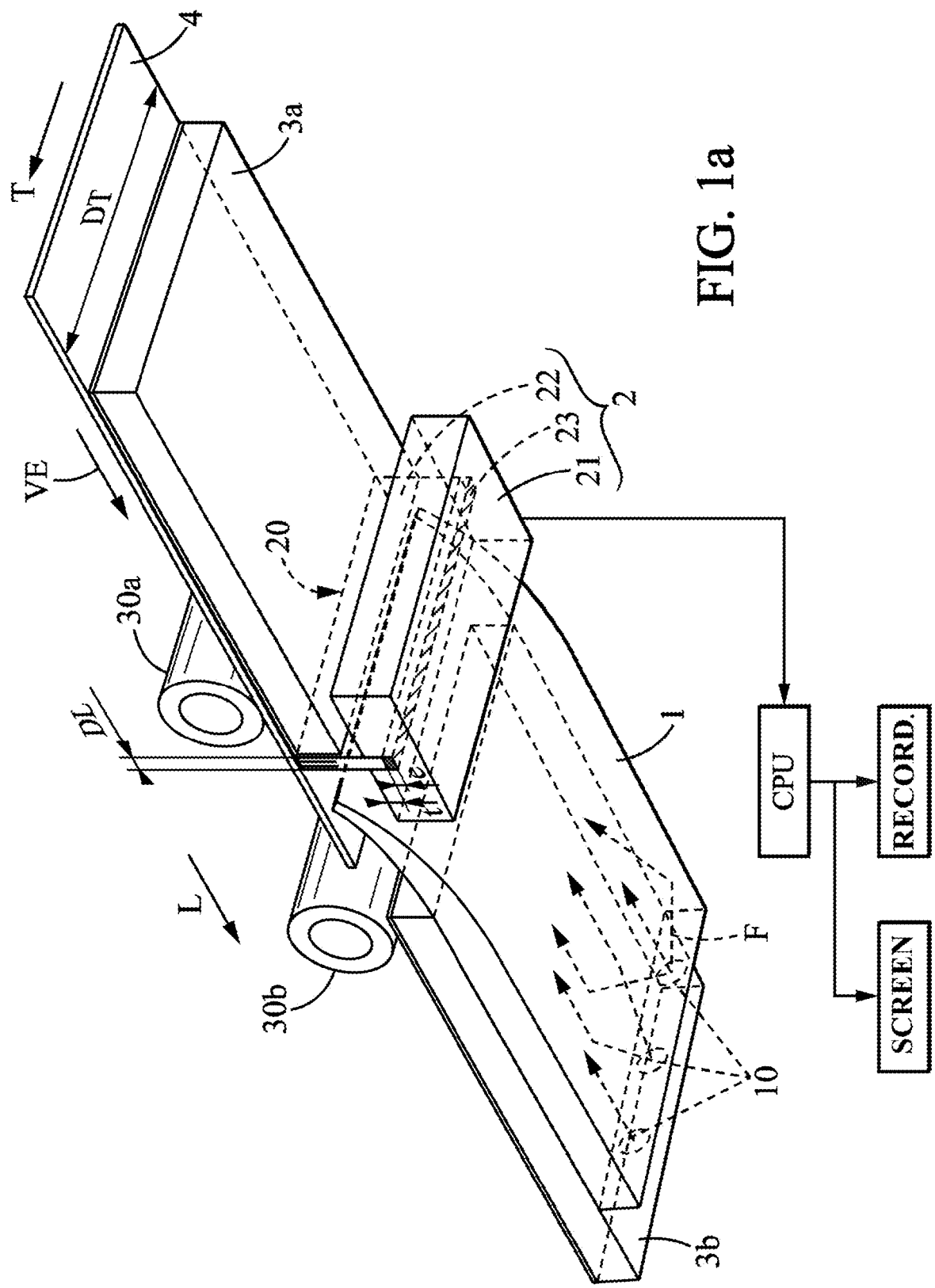
FIGS. 1a and 1b are a perspective view from below and a cross-sectional view, respectively, of a phosphorescent plate reader according to the invention.
Figure 1B:
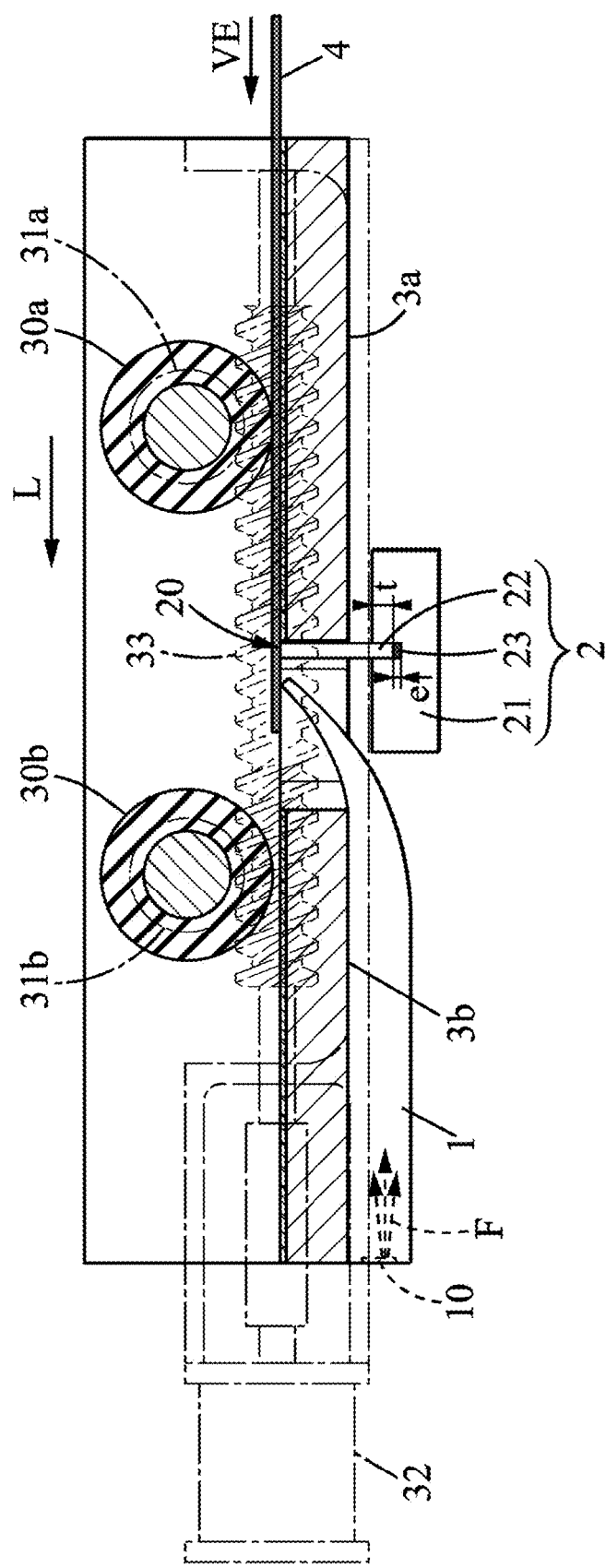

The reference signs indicated in FIGS. 1a and 1b have the following meanings:

1 light guide
10 sources of stimulating light
2 reading unit
20 entrance window of the reading unit
21 image sensor
22 optical system
23 filtering element
3a, 3b segments of a sliding support, or slider bed
30a, 30b drive rollers
31a, 31b pinions fixed to the drive rollers
32 stepping motor
33 shaft in the form of an endless screw
4 phosphorescent plate
VE translation drive speed of the phosphorescent plate being read
L longitudinal direction of the phosphorescent plate reader, parallel to the drive speed VE and oriented from upstream to downstream relative to the direction of the drive speed VE
T transverse direction of the phosphorescent plate reader, perpendicular to the longitudinal direction L
DT transverse length of the phosphorescent plate
DL length of columns of the image sensor The sliding support segments 3a and 3b are coplanar and constituted at their surface by a material having a low coefficient of friction, such as polytetrafluoroethylene (PTFE). They are laterally limited by two walls (not shown in FIG. 1a) in order to guide a sliding of the phosphorescent plate 4 on the segments 3a and 3b, parallel to the longitudinal direction L. The plate 4 is driven in the longitudinal direction L by the rollers 30a and 30b, which are themselves rotated by the stepping motor 32 (FIG. 1b) and via the shaft 33 and the pinions 31a and 31b. In order to drive the plate 4 precisely at the speed VE controlled by the motor 32, the rollers 30a and 30b may be covered with a non-slip material such as polyurethane (PU), so as to avoid slipping between these rollers and the plate 4. The sliding support segments 3a and 3b, the drive rollers 30a and 30b, the pinions 31a and 31b, the motor 32 and the shaft 33 constitute a drive mechanism for the plate 4. Other equivalent embodiments of the drive mechanism may alternatively be implemented.

The two sliding support elements 3a and 3b have an intermediate space through which the stimulating light is directed onto the plate 4, and the phosphorescence radiation that is produced by the plate 4 is collected by the reading unit 2.

The light guide 1 may be constituted by a transparent material such as polycarbonate, and is capable of guiding by total internal reflection the flow of stimulating light F that is produced by the sources 10. In embodiments of the invention, the sources 10 may be light-emitting diodes, and the stimulating light F can be red. It is advantageous to filter the sources 10 upstream of the light guide 1 in order to ensure spectral purity of this source, and thus optimize the efficiency of the filtering element 23 that is described below. The guide 1 has a shape that is capable of directing the stimulating light F onto the phosphorescent plate 4 in the form of a beam which has a transverse extent greater than or equal to the transverse length DT of the plate. In addition, this beam of stimulating light F is inclined relative to a direction perpendicular to the sliding support segments 3a and 3b, so that the emergence direction of the stimulating light F, at the exit of the guide 1 towards the plate 4, is orientated obliquely towards the upstream of the movement of the plate 4 in the reader. In other words, the beam of the stimulating light F has a component of its propagation vector that is in the direction opposite that of the drive speed VE of the plate 4, when the stimulating light F reaches the surface of the plate 4.

The entrance window 20, the image sensor 21, the optical system 22 and the filtering element 23 belong to the reading unit 2. The reading unit 2 detects the phosphorescence radiation that is produced by the plate 4 when it receives the excitation light F after at least parts of this plate 4 have previously been exposed to recording radiation, for example X-rays. According to a feature of the invention for this type of embodiments of the reader, one and same point on the phosphorescent plate 4 first passes in front of the entrance window 20 of the reading unit 2, then in front of the exit of the light guide 1 from which the stimulating light F emerges. In other words, the light stimulation means are arranged downstream of the reading unit 2 relative to the drive direction of the plate 4 being read, as shown in the figures by the drive speed arrow VE. But as will be described later in relation to FIG. 4, the plate 4 is designed so that the stimulating light F diffuses in the phosphorescent material thereof in a direction opposite to the movement of the plate 4 in the reader, up to in front of the entrance window 20, preferably without going beyond the upstream limit thereof relative to the direction of the speed VE. Thus, the phosphorescence radiation is produced by the plate 4 at the window 20 and can be collected by the reading unit 2 through this window 20.

The optical system 22 optically conjugates the transverse strip of the plate 4 that is located in front of the entrance window 20 at a moment of the moving of the plate 4 being read, with the photosensitive surface of the image sensor 21. According to the embodiments of the reader, the entrance window 20 may be material, or simply denote the point of entrance for the phosphorescence radiation into the optical system 22 of the reading unit 2. The optical system 22 can have any magnification whatsoever, as a function of its constitution.

However, in order to increase the efficiency of the collection of phosphorescence radiation, the optical system 22 advantageously has a large numerical aperture: greater than 0.70 and preferably greater than 0.90. To this end, the optical system 22 may comprise, advantageously from the entrance window 20 for the phosphorescence radiation, a fiber-optic faceplate, the optical axis of which is perpendicular to the plate 4 being read. Such an optical component is well known to a person skilled in the art. It is constituted by segments of optical fibers that are assembled parallel to each other between two flat surfaces of the component. Such fiber-optic faceplate can be used alone in order to form the optical system 22, or in combination with other imaging components. In a manner that is preferential for the invention, a fiber-optic faceplate is used that has an image magnification equal to unity. In order to capture the image on the plate 4 over the whole transverse strip thereof during a single reading pass, the fiber-optic faceplate preferably has a transverse dimension, in the direction T, that is greater than or equal to the length DT of the transverse strip of the plate 4.

For phosphorescent plates that have been used with the reader of the invention, the phosphorescence radiation is blue visible light. In order not to saturate the image sensor 21 and to increase a contrast of the reading image of each plate, it is preferable to efficiently filter the radiation which passes through the entrance window 20 in order to eliminate a significant part of the red stimulating light which passes through the entrance window 20 at the same time as the phosphorescence radiation. To this end, a layer of an optical filtering material can be arranged at the entrance window 20, or at another level of the optical system 22, or just in front of the photosensitive surface of the image sensor 21. Possibly, organic components can be used as filtering materials in order to absorb the stimulating light while also being as transparent as possible for phosphorescence radiation. But such organic components are generally fluorescent themselves, so it is necessary to provide an additional filter in order to eliminate the fluorescent radiation which originates from the organic compounds. For this reason, the inventors recommend using inorganic compounds, i.e. minerals, in order to constitute the filtering element 23, as such mineral compounds can be free of fluorescence. In particular, cobalt aluminate ($CoAl_2O_4$), also called cobalt blue, or cobalt stannate ($CoSnO_3$), also called cerulean blue, may be used to this end, in a layer 10 μm to 20 μm thick, for example, in order to form the filtering element 23.

Alternatively, or in combination with the use of a specific filtering element such as that which has just been described, it is possible to use an optical material for at least some of the components of the optical system 22 which is transparent for the phosphorescence radiation and absorbing for the stimulating light F. In particular, when a fiber-optic faceplate is used, the transparent material which constitutes the core of the optical fibers may be chosen in order to selectively transmit the phosphorescence radiation (blue light in the example given) while absorbing the stimulating light F (red light in the example) with a high level of efficiency. Blue glass denoted BG39 and that which is denoted BG3, and which are produced by Schott, are suitable for the production of filtering optical fibers.

The image sensor 21 is of the type of time-delay-integration, or TDI, array sensor. Such a sensor is well known to a person skilled in the art. The photosensitive surface of the TDI sensor is constituted by photosensitive elements that are distributed in lines and in columns, and respective accumulation signals from the photosensitive elements are transferred from one line to the next, parallel to the column direction. The last line forms the output register, through each line of image points is read. According to the principle of such a sensor, an image is captured while the image is shifted over the photosensitive surface of the sensor parallel to the columns, with image shifting that is simultaneous to the line-transfer of the sensor. Thus, the plate 4 that is being read can be image-captured during the whole movement of a transverse strip of this plate in front of the entrance window 20 of the reading unit 2. In general, it is necessary for the drive speed VE of the plate 4 to be equal to the product of the line-transfer speed of the TDI image sensor and the magnification of the optical system 22. In this sense, the line-transfer speed of the TDI image sensor is parallel to and said to be correlated with the drive speed VE of the plate 4 via the drive mechanism. Of course, if the magnification of the optical system 22 is negative, the line transfer speed and the drive speed VE are oriented in opposite directions. Finally, when the single imaging component of the optical system 22 is the fiber-optic faceplate with magnification equal to unity, the line-transfer speed of the TDI sensor needs to be equal to the drive speed VE of the plate 4, and in the same direction as this latter.

Figure 2:
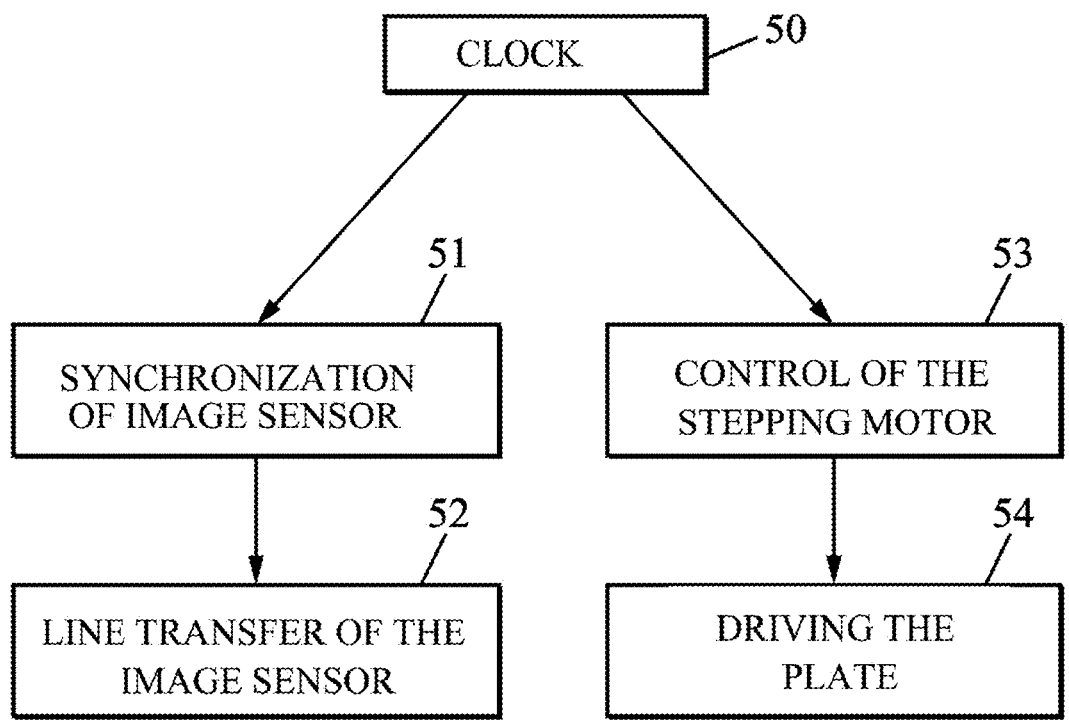
FIG. 2 shows a control method for a phosphorescent plate reader according to the invention.

FIG. 2 is a block diagram that shows an example of the open-loop control architecture, making it possible to ensure such correlation between the line-transfer speed of the TDI sensor 21 and the drive speed VE of the plate 4. A common clock synchronizes the operation of the TDI sensor 21 (box 51) and the stepping motor 32 (box 53) in parallel. Optionally, frequency dividers may be inserted between the clock 50 and the control of the TDI sensor 21 on the one hand, and between the clock 50 and the control of the stepping motor 32 on the other hand. The line-transfer speed of the TDI sensor 21 (box 52) then results from the synchronization of the operation of this sensor (box 51). Simultaneously, the drive speed VE of the plate 4 (box 54) results from the control of the motor 32 (box 53), from the basic pitch angle of this motor and from the transmission ratio which is produced by the shaft 33, the pinions 31a, 31b and the diameter of the rollers 30a, 30b. A person skilled in the art then knows how to program the clock 50 and the necessary frequency dividers, in particular using a programmable logic circuit of the FPGA type, in order to obtain the necessary correlation between the drive speed VE and the line-transfer speed of the TDI sensor. For example, when the spacing of the photodetectors in the photosensitive surface of the TDI sensor 21 is equal to 14 μm (micrometers), and the magnification of the optical system 22 is equal to unity, the plate 4 may be successively advanced twice by 7 μm at each line-transfer cycle of the TDI sensor 21. Now, the tolerance to compression of the polyurethane surface of each drive roller 30a, 30b against the plate 4, and the tolerance of the thickness of the plate 4 itself, is selected to be below 50 μm in order to ensure an error that is less than half of the spacing of the photodetectors, between the image that is captured by the TDI sensor 21 and the image that is recorded in the plate 4. A pad made from elastomer may advantageously be arranged above the plate 4, at the entrance window 20, in order to ensure that the plate 4 is well applied against the optical system 22 and to thus ensure a high resolution.

Of course, other methods can be used alternatively in order to obtain the correlation between the drive speed VE and the line-transfer speed of the TDI sensor. In particular, marks or elements of the plate 4 can be detected in an image which is captured from this plate, and the drive speed VE that is generated by the motor 32 may be correlated in a closed loop with the line-transfer speed of the TDI sensor 21.

In order to gain maximum advantage from the image field of the fiber-optic faceplate, a longitudinal dimension of the latter, called DL and measured parallel to the direction L, is advantageously less than or equal to a length of columns of the TDI sensor, when the optical system 22 has a magnification that is equal to unity.

The TDI sensor may be of the CCD type. Preferentially, it may be of the CCD sensor type that has been thinned at the rear face and intended to receive radiation to be detected through this rear face ("back-thinned CCD") in order to have a greater light sensitivity. Such image sensors are commercially available and well known to a person skilled in the art.

Figure 3:
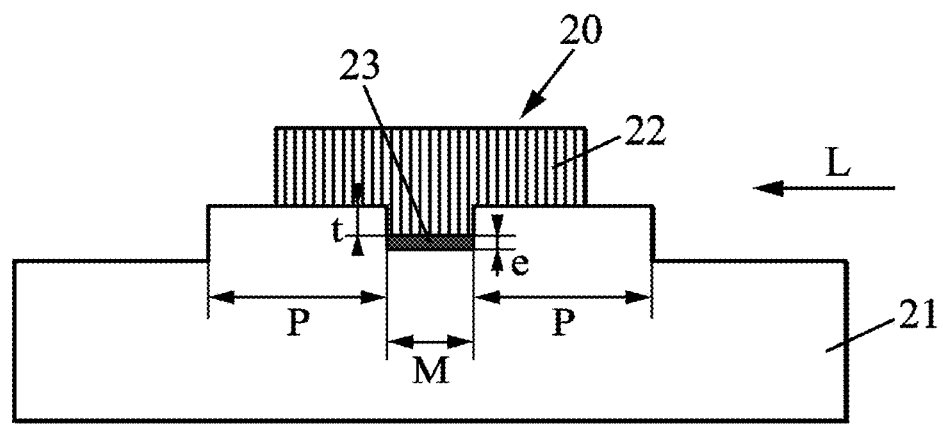
FIG. 3 is a cross-section of a reading unit for a phosphorescent plate reader, according to a preferred embodiment of the invention.

FIG. 3 shows a preferential arrangement of the fiber-optic faceplate which is used to form the optical system 22, on such a CCD sensor that has been thinned down at the rear face and intended to receive radiation to be detected through this rear face. In the transverse cross-section in FIG. 3, the letter M denotes the thinning area of the image sensor 21, and the letters P denote two lateral areas in which the sensor 21 has not been thinned. The fiber-optic faceplate can be machined back on both sides, so that a central part of the fiber-optic faceplate penetrates as far as the thinned area M of the sensor, between the two non-thinned areas P. Thus it is possible to obtain very low resolution loss at the output of the optical fibers in front of the photosensitive surface of the image sensor. The fiber-optic faceplate can then be maintained in position on the image sensor 21 by bonding, with an opaque adhesive that is arranged in the non-thinned areas P. In addition, the filtering element 23 can be arranged on the thinned area M of the image sensor 21, between this latter and the fiber-optic faceplate. t denotes the depth of penetration of the central part of the fiber-optic faceplate between both non-thinned areas P of the image sensor 21, and e denotes the thickness of the filtering element 23. For example, t may be equal to approximately 280 μm (micrometers), and e can be equal to 20 μm.

The image that is captured by the image sensor 21 may be transmitted to a processing unit denoted CPU on FIG. 1*a*, then recorded or displayed on a display screen.

Figure 4:
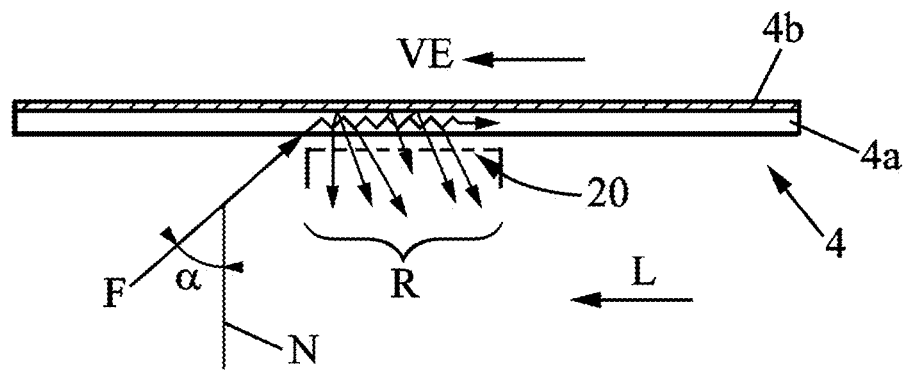
FIG. 4 is a cross-section of a phosphorescent plate being read in a reader according to FIGS. 1a and 1b.

According to FIG. 4, in which the drive speed VE is reported for a phosphorescent plate 4 being read, the plate 4 comprises a layer 4*a* of phosphorescent material, for example based on cesium bromide (CsBr), and a layer 4*b* of a reflecting material, such as aluminum (Al). The layer 4*a* is on the layer 4*b*, preferably without any intermediate layer. FIG. 4 shows the beam of excitation light F which is inclined relative to the direction perpendicular to the plate 4*a*, called N, such that the propagation vector of the beam F has a component antiparallel to the vector of the drive speed VE. In other words, the angle of inclination a as shown is comprised between 0° and 90°. Thanks to this angle of inclination, the excitation light diffuses inside the layer 4*a* over a distance that is longer in the upstream direction of the movement of the plate 4. During this diffusion, it causes emission of phosphorescence radiation R by the layer 4*a*, in proportion to the quantity of image recording radiation that has been received at each point on the plate 4 during the exposure phase. The phosphorescence radiation R is emitted towards the reflecting layer 4*b* and through the free surface of the layer 4*a*, i.e. in the direction of the reading unit 2. The reflecting layer 4*b* then redirects the part of the radiation that has been emitted towards it in the direction of the reading unit 2, thus producing a gain of a factor that is comprised between 1.5 and 2.0 on the reading efficiency. The use of phosphorescent plates of the "Needle Imaging Plate" or NIP type improves the spatial resolution of the image that is recorded in such plate during exposure to the recording radiation, and improves the reproduction of this resolution during reading using a reader according to the present invention. In such NIP plates, the phosphorescent material is arranged in the form of needles that are oriented in the layer 4*a*. This type of NIP phosphorescent plates also increases by its own the reading efficiency.

Figure 5:
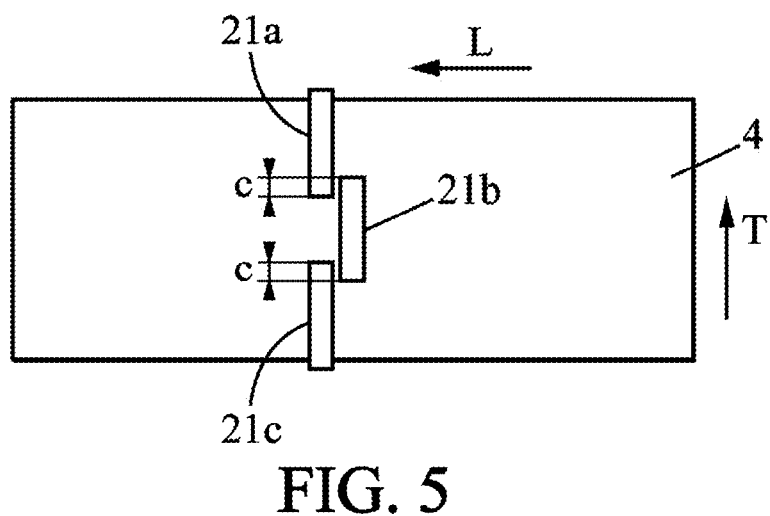
FIG. 5 shows a possible arrangement of several image sensors in a phosphorescent plate reader according to the invention.

FIG. 5 shows an improvement of a reader according to the invention, in order to use phosphorescent plates with greater transverse dimension. Several identical image sensors, for example three sensors 21*a*-21*c*, can be arranged transversally so that joining together the image segments which have been respectively captured by these sensors makes it possible to reconstitute the complete image of the plate 4. Preferably, these sensors may have overlaps c in the transverse direction T, in order to facilitate the reconstruction of the complete image. For such structure of a reader with several image sensors, each of the sensors is associated with an optical system which is dedicated to it, and dedicated stimulation means, each time in the manner that has been described above for a reader with a single image sensor.

Taking into account all of the improvements that have been described for a phosphorescent plate reader according to the invention, with means for stimulation using red light, the inventors have obtained a reading efficiency of the order of 47% to 51%, this efficiency being defined as the number of phosphorescence photons that are detected relative to the number of electrons that have been excited in the phosphorescent material during the recording step and which have remained in this state until the plate is introduced into the reader. Simultaneously, a spatial resolution that is comprised between 15 Lp/mm (Lp/mm signifying pair of lines per millimeter) and 20 Lp/mm can be obtained.

Figure 6:
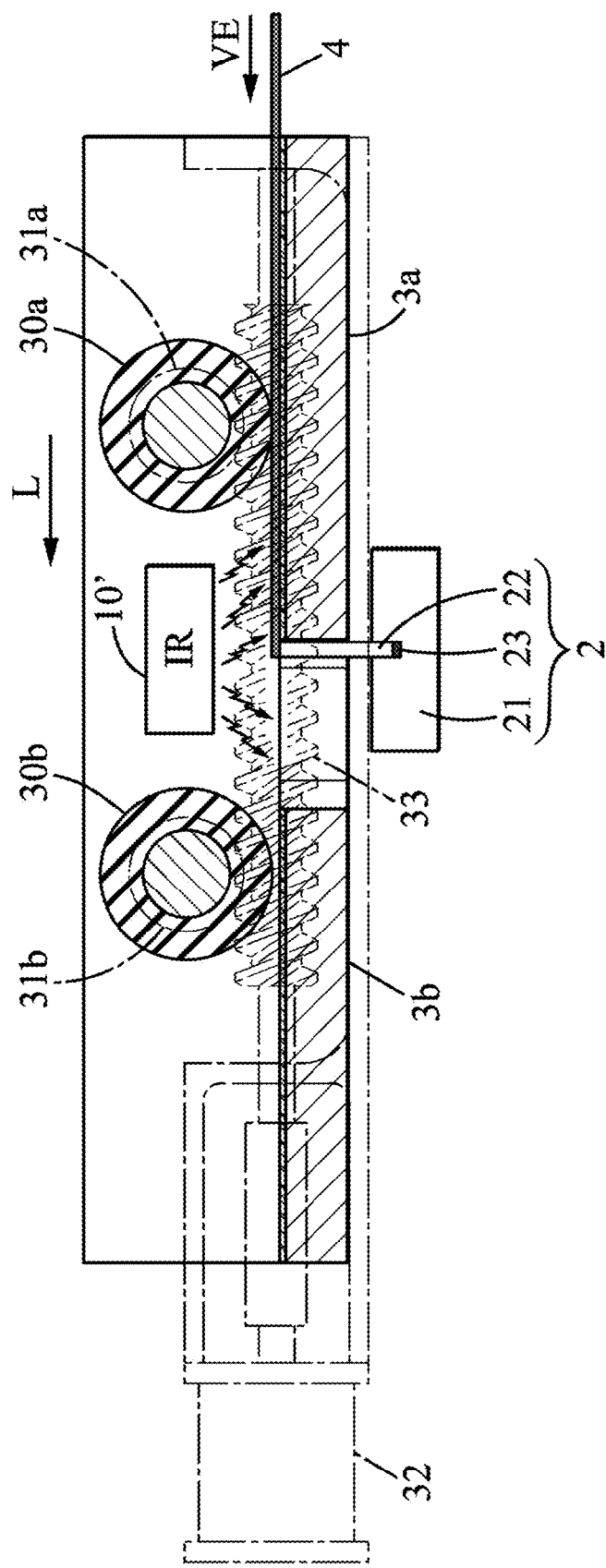
FIG. 6 is a cross-section view of another phosphorescent plate reader according to the invention.

FIG. 6 shows an alternative embodiment of the invention, in which the stimulation means are of the nature of a heat source, instead of a light source. In other words, reading the plate is based on thermoluminescence. The reference 10' thus denotes a heat source, for example a source of infrared radiation (IR) that is preferably arranged on the side of the phosphorescent plate 4 being read which is opposite to the reading unit 2. This heat source 10 extends over the whole width of the sliding support segments 3*a* and 3*b*, in the transverse direction T. It is arranged above or below the intermediate interval between both segments 3*a* and 3*b*, but may be offset towards the upstream or downstream of the movement of the plate 4, relative to the entrance window 20 of the reading unit 2, as a function of the characteristics of heat diffusion in this plate in the longitudinal direction L. Optionally, the plate 4 may be adapted in order to obtain features for the heat diffusion which increase the reading efficiency. In particular, the layer 4*b* may be optimized to this end, in particular through the choice of the reflecting material, the thickness of the layer 4*b*, and a possible texturizing of this latter.

In order to improve the contrast and the accuracy of the reading of an image recorded in a phosphorescent plate, using a reader according to the invention, the reading method may comprise two correction steps, in addition to the reading step. The image that is recorded in the phosphorescent plate is first read in the manner described above, during a first passage of the plate in the reader. The raw image is thus captured and stored. At the end of this first reading passage, the image that was recorded in the phosphorescent plate has been erased, since all of the excited electrons which constituted the recorded image have returned to their ground state under the influence of the stimulating light or stimulating heat.

A first correction step is carried out by passing the same phosphorescent plate into the reader once more, and by recording a second image, called background image. This background image shows the reading defects that are caused by the plate used and/or the reader. In particular, they comprise the effect of a quantity of excitation light that would nevertheless reach the image sensor through the filtering element and the optical system. This background image is then subtracted from the raw image using software. In other words, the intensity of the background image at a point of the image is subtracted from the intensity of the raw image at the same point. Optionally, the intensities of the background image may be replaced by those of a TDI reading that is carried out by keeping the phosphorescent plate immobile under the entrance window of the reading unit. Average values for the background image can thus be obtained, relative to the longitudinal direction L, which take into account the residual amounts of the stimulating light which reach the image sensor. This step reduces the demands on the elimination efficiency of the stimulating light by the filtering element 43.

The second correction step consists in exposing the same plate once more to a recording radiation which is assumed to be uniform, then to perform again a reading operation. The new image that is captured then shows the defects in the uniformity of response of the different components of the reading unit 2 and of the plate 4 to the phosphorescence radiation. It is used in order to determine a local response function of the reading system. This response function then makes it possible to apply a local correction processing to the raw image, by multiplying or dividing the intensity of the raw image at each point of the image by the response function at this point. A person skilled in the art knows how to select between multiplication and division operations depending the definition used for the response function.

Preferably, the first correction step may be carried out before the second correction step, so that the second one is applied to the raw image from which the background image has been already subtracted.

It is understood that the invention can be reproduced by adapting or modifying secondary aspects thereof that have been described by way of illustration, while retaining at least some of the advantages mentioned. By way of reminder, the invention provides a reader for computed radiography which has the following advantages:

this reader produces a high reading efficiency, or sensitivity;
the operation of the reader is rapid;
it produces a high-quality spatial resolution;
the production cost of the reader is reduced; and
the space requirement of the reader is limited.

The invention claimed is:

1. A phosphorescent plate reader, comprising:
   stimulation means (1, 10) for directing a flow of stimulating energy over an entire transverse strip of a phosphorescent plate (4) to be read;
   at least one reading unit (2), that includes an entrance window (20) for collecting a phosphorescence radiation that is produced by portions of the phosphorescent plate in response to the flow of stimulating energy, at least one image sensor (21), and an optical system (22) configured to transfer the phosphorescence radiation from the entrance window to the image sensor; and
   a drive mechanism that drives and guides in translation the plate (4) so that said plate passes in front of the stimulation means (1, 10) and the entrance window (20) of the reading unit (2), so that the image sensor (21) captures an image of the entire transverse strip of the plate (4), said image being formed by the phosphorescence radiation while the plate is driven in translation,
   the image sensor (21) being of the time-delay-integration array sensor type, and the reader is adapted so that said time-delay-integration image array sensor has a line-transfer speed that is parallel to and correlated with a drive speed of the plate (4) via the drive mechanism, and
   the stimulation means (1, 10) being arranged downstream of the entrance window (20) of the reading unit (2) relative to a direction of the translation of the plate (4), in order to direct the flow of stimulating energy onto said plate in the form of a beam of stimulating light which is incident on the plate on a same side thereof as the reading unit, and which simultaneously diffuses in the whole transverse strip of the plate up to upstream of the entrance window of the reading unit relative to the direction of the translation of the plate.

2. The reader according to claim 1, wherein the stimulation means (1, 10) direct the beam of stimulating light onto the plate (4) with a propagation vector of said beam which is oblique in a direction of the entrance window (20) of the reading unit (2), relative to a direction perpendicular to said plate.

3. The reader according to claim 2, wherein the reading unit (2) also includes a filtering element (23) arranged between the optical system (22) and the time-delay-integration image array sensor (21), or at the entrance window (20), said filtering element (23) configured to transmit the phosphorescence radiation selectively with respect to the stimulating light.

4. The reader according to claim 2,
   wherein the optical system (22) of the reading unit (2) includes a fiber-optic faceplate having a transverse dimension that is greater than or equal to a length of the transverse strip of the plate (4), said transverse dimension of the fiber-optic faceplate and the length of the transverse strip of the plate being measured perpendicular to a translation drive direction of the plate, and
   wherein the fiber-optic faceplate has a longitudinal dimension that is less than or equal to a length of columns of the time-delay-integration image array sensor (21), said longitudinal dimension of the fiber-optic faceplate and said length of columns being measured parallel to the translation drive direction of the plate (4).

5. The reader according to claim 1, wherein the reading unit (2) also includes a filtering element (23) arranged between the optical system (22) and the time-delay-integration image array sensor (21), or at the entrance window (20), said filtering element (23) configured to transmit the phosphorescence radiation selectively with respect to the stimulating light.

6. The reader according to claim 5, wherein the filtering element (23) includes an inorganic material based on metal oxides.

7. The reader of claim 6, wherein the metal oxide is cobalt aluminate or cobalt stannate.

8. The reader according to claim 1, wherein the time-delay-integration image array detector is of the charge-coupled device image sensor type.

9. The reader according to claim 1,
   wherein the optical system (22) of the reading unit (2) includes a fiber-optic faceplate having a transverse dimension that is greater than or equal to a length of the transverse strip of the plate (4), said transverse dimension of the fiber-optic faceplate and the length of the transverse strip of the plate being measured perpendicular to a translation drive direction of the plate, and
   wherein the fiber-optic faceplate has a longitudinal dimension that is less than or equal to a length of columns of the time-delay-integration image array sensor (21), said longitudinal dimension of the fiber-optic faceplate and said length of columns being measured parallel to the translation drive direction of the plate (4).

10. The reader according to claim 9, wherein optical fibers of the fiber-optic faceplate are at least partially constituted by a material that selectively transmits the phosphorescence radiation while absorbing part of the stimulating light which has passed through the entrance window (20) of the reading unit (2).

11. The reader according to claim 1, wherein the stimulation means (1, 10; 10') and the reading unit (2) are configured so that the transverse strip of the plate (4), the image of which is formed by the phosphorescence radiation and captured during a single passage of the plate in the reader, has a transverse extent which is greater than 20 mm, perpendicular to a translation drive direction of said plate.

12. The reader of claim 11, wherein the transverse extent is greater than 28 mm.

13. A phosphorescent plate reading set, comprising:
a phosphorescent plate reader according to claim 1; and
at least one phosphorescent plate (4) configured to be introduced into said reader, said plate having a first layer (4a) of a phosphorescent material that produces phosphorescence radiation in response to a stimulating light which illuminates said phosphorescent material, the phosphorescence radiation and the stimulating light having different wavelengths, or in response to heating of the phosphorescent material, in portions of the plate (4) which have been previously exposed to image recording radiation, said phosphorescent plate also having a second layer (4b) of a material that reflects the phosphorescence radiation, which is arranged parallel to the layer of phosphorescent material and so as to be situated opposite the reading unit (2) when the plate (4) is introduced into the reader.

14. A method of reading a phosphorescent plate (4), said method comprising:
using a phosphorescent plate reading set according to claim 10 to read an image previously recorded in the plate during a first passage of said plate in said reader, in order to capture a raw image of the plate formed by the phosphorescence radiation; and
at least one among the following two correction stages:
a process for eliminating device-caused defects, comprising using the reader once more with the same plate (4) during another passage of said plate in said reader that is carried out after the first passage, in order to capture a background image of the plate, then subtracting said background image from the raw image; and
a process for local correction, comprising multiplying or dividing intensities that were captured by the reading unit (2) during the first passage of the plate (4) in the reader, for points of the image in the plate, by a response function that has different values for several of said points of the image.

15. The reader according to claim 1, wherein the time-delay-integration image array detector is of the charge-coupled device image sensor type that has been thinned and is adapted in order to receive the phosphorescence radiation via a rear face of a substrate of said sensor.

16. A phosphorescent plate reader, comprising:
stimulation means (10') for directing a flow of stimulating energy to an entire transverse strip of a phosphorescent plate (4);
at least one reading unit (2) that includes an entrance window (20) for collecting a phosphorescence radiation that is produced by portions of the phosphorescent plate (4) in response to the flow of stimulating energy, at least one image sensor (21), and an optical system (22) configured to transfer the phosphorescence radiation from the entrance window to the image sensor; and
a drive mechanism that drives and guides in translation the plate (4) so that said plate passes in front of the stimulation means (10') and the entrance window (20) of the reading unit (2), so that the image sensor (21) captures an image of the entire transverse strip of the plate (4), said image being formed by the phosphorescence radiation while the plate is driven in translation,
the image sensor (21) being of the time-delay-integration array sensor type, and the reader is adapted so that said time-delay-integration image array sensor has a line-transfer speed that is parallel to and correlated with a drive speed of the plate (4) via the drive mechanism, and
the stimulation means (10') being arranged on a side of the plate (4) that is opposite the reading unit (2), in order to direct the flow of stimulating energy onto said plate in the form of a flow of heat which increases a temperature simultaneously in the entire transverse strip of the plate while said transverse strip passes in front of the entrance window (20) of the reading unit.

17. The reader according to claim 16,
wherein the optical system (22) of the reading unit (2) includes a fiber-optic faceplate having a transverse dimension that is greater than or equal to a length of the transverse strip of the plate (4), said transverse dimension of the fiber-optic faceplate and the length of the transverse strip of the plate being measured perpendicular to a translation drive direction of the plate, and
wherein the fiber-optic faceplate has a longitudinal dimension that is less than or equal to a length of columns of the time-delay-integration image array sensor (21), said longitudinal dimension of the fiber-optic faceplate and said length of columns being measured parallel to the translation drive direction of the plate (4).

18. The reader according to claim 16, wherein the stimulation means and the reading unit are configured so that the transverse strip of the plate, the image of which is formed by the phosphorescence radiation and captured during a single passage of the plate in the reader, has a transverse extent which is greater than 20 mm, perpendicular to a translation drive direction of said plate.

19. A phosphorescent plate reading set, comprising:
a phosphorescent plate reader according to claim 16; and
at least one phosphorescent plate (4) configured to be introduced into said reader, said plate having a first layer (4a) of a phosphorescent material that produces phosphorescence radiation in response to a stimulating light which illuminates said phosphorescent material, the phosphorescence radiation and the stimulating light having different wavelengths, or in response to heating of the phosphorescent material, in portions of the plate (4) which have been previously exposed to image recording radiation, said phosphorescent plate also having a second layer (4b) of a material that reflects the phosphorescence radiation, which is arranged parallel to the layer of phosphorescent material and so as to be situated opposite the reading unit (2) when the plate (4) is introduced into the reader.

* * * * *